(12) United States Patent
Barre

(10) Patent No.: US 8,261,419 B2
(45) Date of Patent: Sep. 11, 2012

(54) TOOL USED FOR THE PRESSURE CRIMPING AND DRIVING-OUT OF A CLEAT

(75) Inventor: Didier Barre, La Fumade (FR)

(73) Assignee: Areva NC, Paris (FR)

( * ) Notice: Subject to any disclaimer, the term of this patent is extended or adjusted under 35 U.S.C. 154(b) by 543 days.

(21) Appl. No.: 12/521,861

(22) PCT Filed: Dec. 28, 2007

(86) PCT No.: PCT/EP2007/064611
§ 371 (c)(1),
(2), (4) Date: Aug. 14, 2009

(87) PCT Pub. No.: WO2008/080967
PCT Pub. Date: Jul. 10, 2008

(65) Prior Publication Data
US 2010/0011561 A1    Jan. 21, 2010

(30) Foreign Application Priority Data
Jan. 3, 2007    (FR) .................................... 07 52518

(51) Int. Cl.
*B23P 19/00* (2006.01)
*B23P 19/04* (2006.01)
*B21D 39/00* (2006.01)
(52) U.S. Cl. .............................. 29/426.5; 29/505; 29/247

(58) Field of Classification Search ................... 29/505, 29/247, 281.3, 426.1, 426.5, 428, 464, 465, 29/466, 468, 525, 723
See application file for complete search history.

(56) References Cited

U.S. PATENT DOCUMENTS

| 1,600,570 A * | 9/1926 | Wenn .............................. 29/505 |
| 2003/0084555 A1 | 5/2003 | Meggiolan |
| 2004/0034978 A1 | 2/2004 | Crevoisier |

FOREIGN PATENT DOCUMENTS

| EP | 0 636 459 | 2/1995 |
| GB | 912703 | 12/1962 |
| JP | 10-216858 | 8/1998 |
| JP | 2003-2342 | 1/2003 |

* cited by examiner

*Primary Examiner* — John C Hong
(74) *Attorney, Agent, or Firm* — Nixon Peabody LLP

(57) ABSTRACT

The invention relates to a tool used for pressure crimping and driving-out of a cleat, comprising: (a) a first receptacle opposite which is located a crimping head movably mounted on a body of the tool; (b) a second receptacle opposite which is located a drive-out head also movably mounted on the body; and (c) pressure means movably mounted on the body so as to be able to be displaced from a crimping position in which they are capable of exerting pressure on the crimping head, to a drive-out position in which they are capable of exerting pressure on the drive-out head, and conversely.

15 Claims, 8 Drawing Sheets

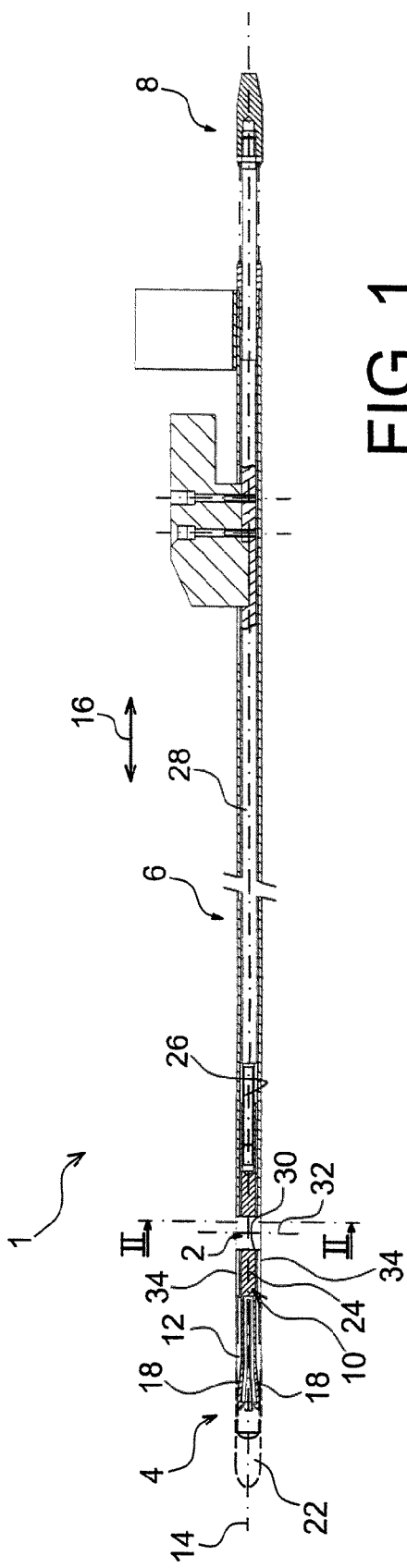
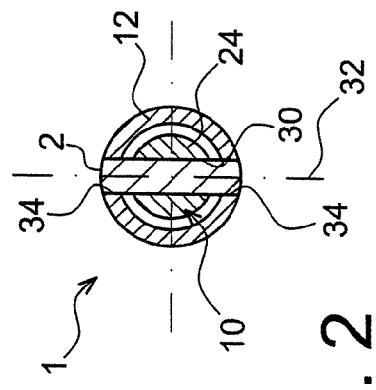
FIG. 1
FIG. 2

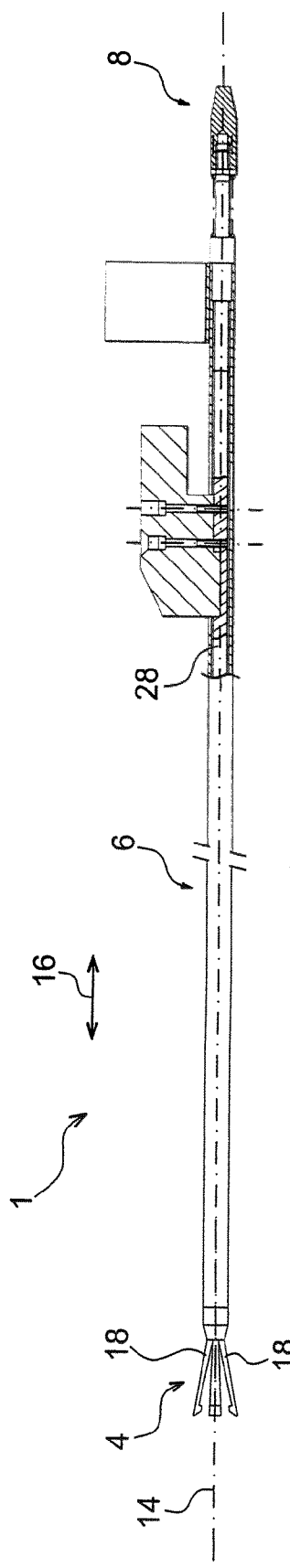
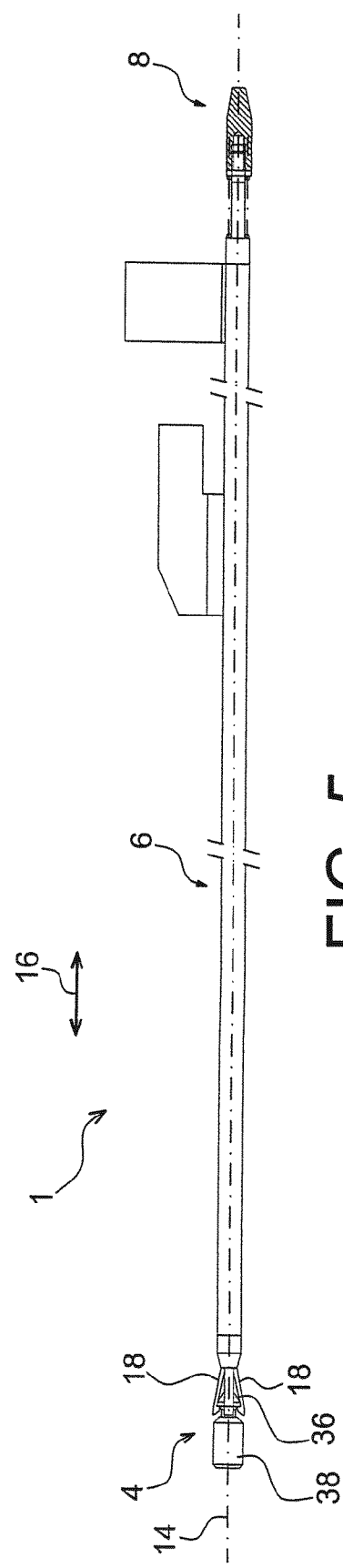

TOOL USED FOR THE PRESSURE CRIMPING AND DRIVING-OUT OF A CLEAT

CROSS REFERENCE TO RELATED APPLICATIONS or PRIORITY CLAIM

This application is a national phase of International Application No. PCT/EP2007/064611, entitled "TOOL FOR THE PRESSURE CRIMPING AND DRIVING-OUT OF A CLEAT", which was filed on Dec. 28, 2007, and which claims priority of French Patent Application No. 07 52518, filed Jan. 3, 2007.

DESCRIPTION

The present invention relates to a tool used for pressure crimping a cleat/cotter pin in an element as well as to the extraction of the cleat/cotter pin out of this element by driving it out by pressure.

A preferred but by no means limiting application of the present invention relates to the pressure crimping/driving-out of a cleat/cotter pin, establishing a mechanical connection between a mechanical tulip and its lock jointly forming a claw, preferably used for cooperating with a nuclear fuel pencil within the scope of its introduction into a storage basket also called a skeleton, and/or of its extraction out of this basket.

To do this, the object of the invention is a tool used for pressure crimping a cleat/cotter pin in an element as well as the extraction of the cleat/cotter pin out of this element by driving it out by pressure, this tool comprising:

a first receptacle of the element opposite which is located a head for pressure crimping intended to cooperate with the cleat/cotter pin, this pressure crimping head being movably mounted along a first direction on a body of the tool;

a second receptable of the element opposite which is located a pressure drive-out head intended to cooperate with the cleat/cotter pin, this pressure drive-out head being also movably mounted along a second direction of the body of the tool; and pressure means movably mounted on the body of the tool capable of displacement from a crimping position in which they are capable of exerting pressure on the pressure crimping head in order to cause its displacement in the first direction, to a drive-out position in which they are capable of exerting pressure on the pressure drive-out head in order to cause its displacement in the second direction, and conversely.

Thus, the invention advantageously has the particularity of combining the functionalities for the pressure crimping and driving-out of a cleat/cotter pin within a same tool, while preserving reduced bulkiness essentially resulting from the mobility of the pressure means, which may actually be used alternately in order to exert pressure on the crimping head during an operation for placing the cleat/cotter pin in the relevant element, and for exerting pressure on the drive-out head during an operation for extracting this cleat/cotter pin out of the element.

Preferably, the body of the tool has first and second housings respectively receiving the pressure crimping head and the pressure drive-out head. Further, the first and second housings and the pressure crimping and pressure drive-out heads have a geometry forming a foolproofing system preventing the mounting of the pressure crimping head in the second housing, and also preventing the mounting of the pressure drive-out head in the first housing. In this way, the risks of deteriorating the relevant element which may occur if the crimping head was installed on the portion of the tool dedicated to driving-out, or conversely, are totally reduced to zero.

As an indication, if the crimping head were installed on the portion of the tool dedicated to driving-out, therefore in place of the drive-out head, problems would occur because of the presence of clearance in the lower portion of the tool, allowing the recovery of the cleat/cotter pin after extraction of the latter. Indeed, considering the geometry of the crimping punch, the cotter pin/cleat may either begin to be crimped, slide and be blocked in its location with the punch still in the cotter pin/cleat, or transversely urge and be jammed in its location. In both cases, there is a great risk of deteriorating the relevant elements.

Always as an indication, if the drive-out head were installed on the portion of the tool dedicated to crimping, therefore in place of the crimping head, the drive-out head would abut against the cotter pin/cleat, without however causing the expected crimping. Consequently, the cotter pin/cleat may easily be extracted from its housing during subsequent use of the element integrating the cleat, with all the detrimental consequences that this situation may generate.

On the other hand, it is possible to proceed in such a way that the adopted geometries allow the introduction of each head into its associated orifice only when the latter is found in a single and predetermined orientation relatively to the body, thereby ensuring proper positioning of each of the heads relatively to the body of the tool.

Preferably, the pressure crimping head is equipped with abutment means capable of contacting the body, in order to limit the travel of the pressure crimping head, along the first direction, relatively to the body of the tool. With this particularity, the operator may advantageously have a secure means indicating completion of the crimping to him/her, and especially makes it impossible to apply pressure on the cleat over a longer travel than the one which is recognized as sufficient, because of the contacting of the abutment means against the body of the tool. The risks of deteriorating the element and the cleat during crimping are therefore considerably reduced.

Naturally, this end-of-travel abutment system may be provided on the pressure drive-out head, without departing from the scope of the invention.

Preferentially, the tool further comprises first means for centering the element relatively to the pressure crimping head, against which the element is intended to be pressed when it rests in the first receptacle, and further comprises second means for centering the element relatively to the pressure drive-out head, against which the element is intended to be pressed when it rests in the second receptacle.

Of course, this configuration considerably assists the operator in positioning the element on the tool so that the cleat/cotter pin is perfectly opposite to the relevant pressure head.

Still in a preferential way, the first and second directions respectively attached to the pressure crimping head and pressure drive-out head are parallel sliding directions.

On the other hand, the pressure means are preferably mounted so as to be able to freely rotate on the body of the tool, so that these pressure means may be moved from the crimping position to the drive-out position, and conversely, by rotation of these pressure means relatively to the body, along an axis of rotation. Thus, the transition from one to the other of both positions, may advantageously be carried out without disassembling the pressure means mounted on the body of the tool, which provides handling facility and rapidity, very appreciated by the operator.

Preferably, the pressure means comprise a pressure rod mounted on a rod support so as to be able to be moved relatively to the latter along a direction of pressure, the support being mounted so as to be able to freely rotate on a pivot pin belonging to the tool body and extending along an axis of rotation of the pressure means.

In such a case, provision may be made for mounting the pressure rod on the rod support so that it may be moved by screwing relatively to the latter, along the pressure direction. Naturally, other types of mechanical connections might have been contemplated between the pressure rod and its support, such as a connection with gear(s), without departing from the scope of the invention.

Moreover, provision is preferably made for blocking the rod support of the pressure means in translation relatively to the pivot pin, along the axis of rotation, for example by means of two abutment rings fixedly mounted on this pivot pin on either side of the rod support respectively, along the axis of rotation.

Finally, it is possible to proceed in such a way that the pressure means further comprise a control lever mounted on the pressure rod, for example in order to facilitate its setting into motion relatively to the support in the pressure direction, in particular when the setting into motion is obtained by screwing, as this is a preferred solution of the present invention.

On the other hand, the object of the invention is also a method for pressure crimping a cleat/cotter pin in an element, the method being applied by means of tool as described above by placing the element in the first receptacle, and then by actuating pressure means placed in the crimping position so that they cooperate with the pressure crimping head.

The object of the invention is also a method for extracting a cleat/cotter pin by driving it by pressure out of an element in which it is crimped, the method being applied by means of a tool as described above by placing the element in the second receptacle, and then by actuating the pressure means placed in the drive-out position so that they cooperate with the pressure drive-out head.

In both methods discussed above, it is preferably proceeded in such a way that the relevant element is a claw comprising a mechanical tulip and a tulip lock surrounding this tulip and capable of being moved relatively along the latter in an actuation direction in order to generate opening/closing of the mechanical tulip, the cleat/cotter pin being intended to be crimped in a through-orifice of a tulip rod of this mechanical tulip. Naturally, both of these methods may alternatively be applied to claws integrating a cleat/cotter pin and for which the tulip lock would be located inwards relatively to the mechanical tulip, without departing from the scope of the invention.

In the case of the lock surrounding the mechanical tulip, it is preferably provided that the through-orifice of the tulip rod be made in a direction orthogonal to the actuation direction, and on the other hand, in such a way that the cleat/cotter pin is intended to have two sliding ends along the actuation direction, respectively in two opposite oblong holes made on the tulip lock surrounding the mechanical tulip.

Finally, it is noted that the element is preferentially a claw intended to cooperate with a nuclear fuel pencil for introducing it into a storage basket and/or for extracting it out of this basket, this claw being preferably mounted at one end of a tie rod, the other end of which may be equipped with the control of the mechanical tulip.

Other advantages and characteristics of the invention will become apparent in the non-limiting detailed description below.

This description will be made with reference to the appended drawings wherein:

FIG. 1 illustrates a partial sectional view of a device for handling nuclear fuel pencils, having a cleat capable of being crimped by pressure in a given element of the device, as well of being extracted from this same element by driving it out by pressure, by means of a tool according to the present invention;

FIG. 2 illustrates a sectional view taken along the line II-II of FIG. 1;

FIGS. 4 and 5 illustrate side views of the handling device shown in FIG. 1 in different conditions, so that its operation may be understood;

Figure 6:
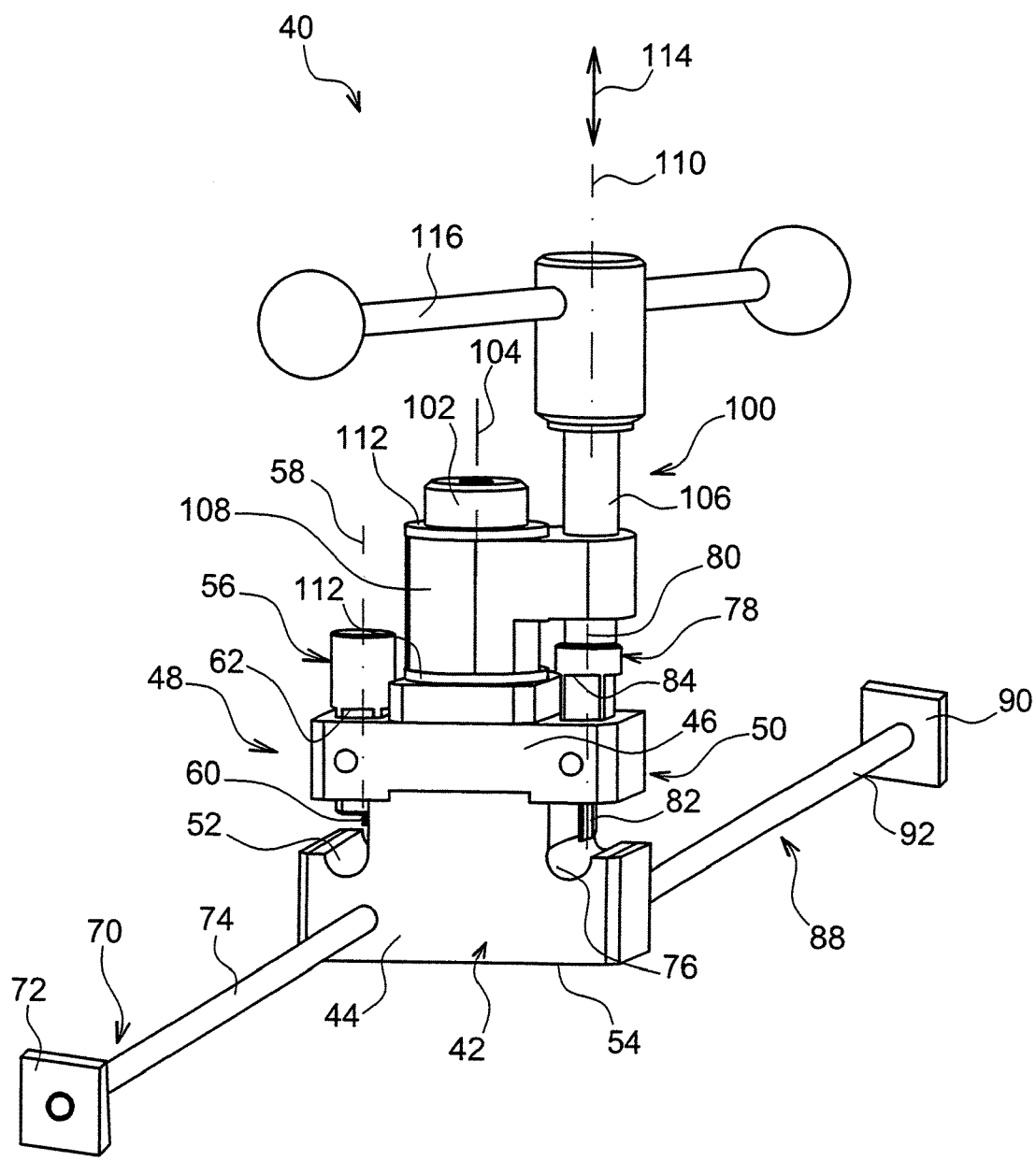
FIG. 6 illustrates a perspective view of a tool appearing as a preferred embodiment of the present invention.
Figure 7:
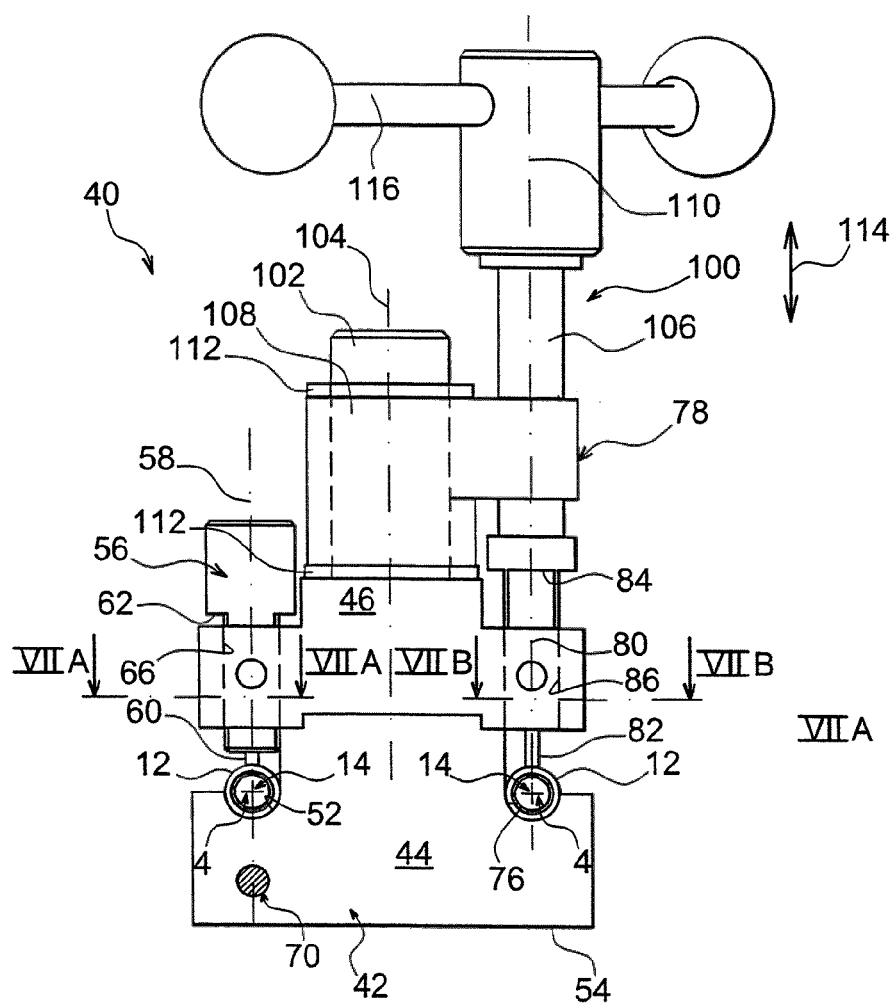
FIG. 7 illustrates a front view of the tool shown in FIG. 6.
Figure 8:
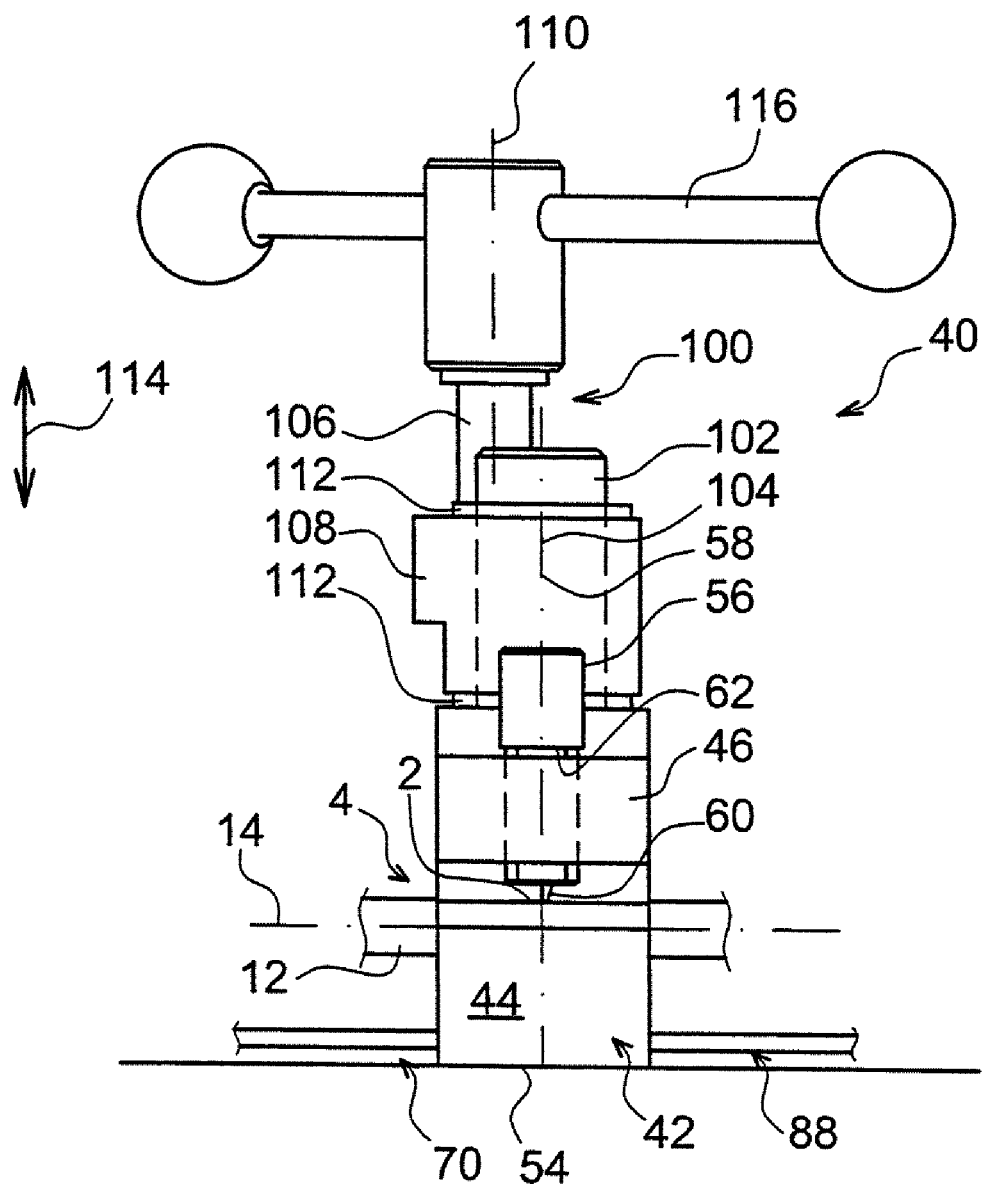
FIG. 8 illustrates a side view of the tool shown in FIGS. 6 and 7.
Figure 9:
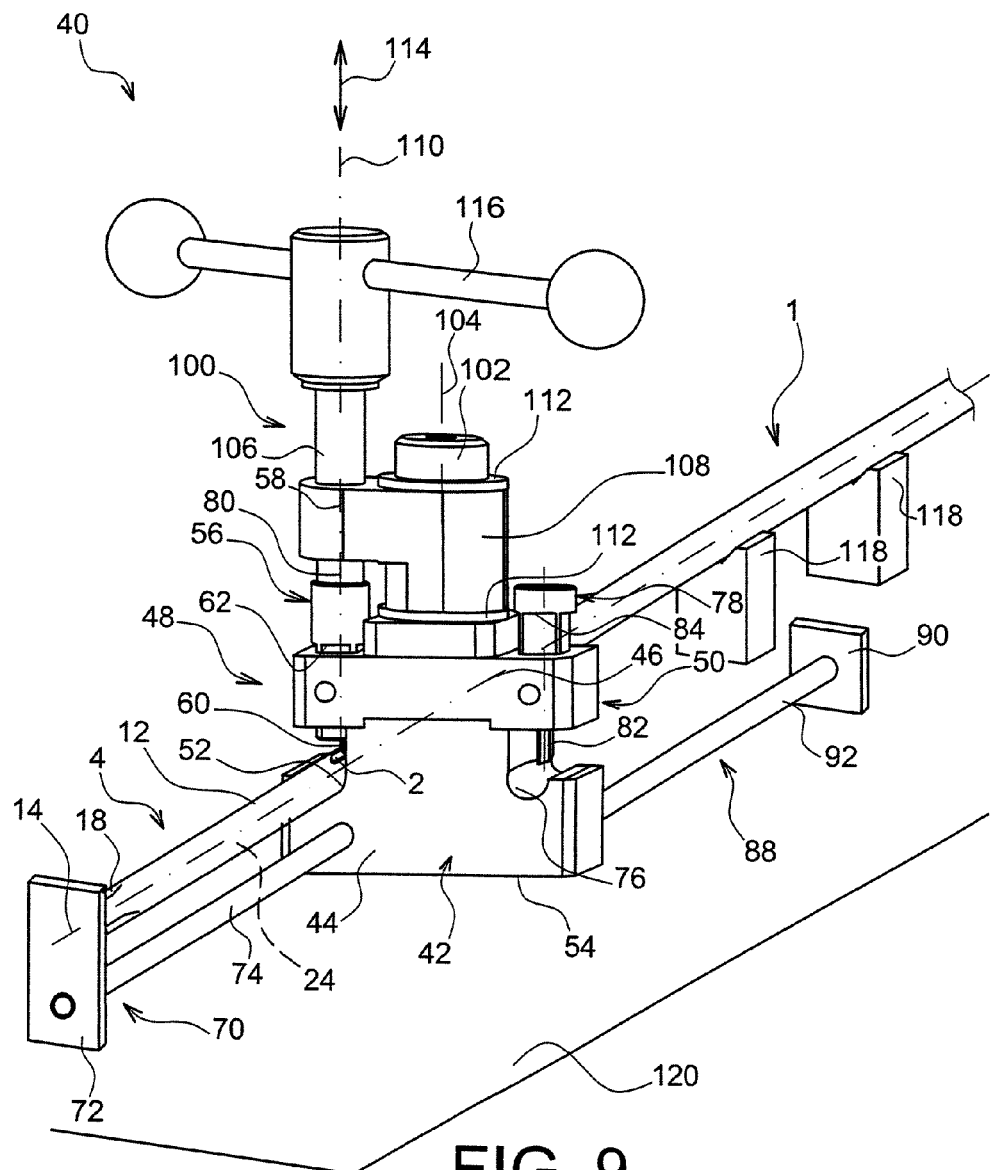
Figure 10:
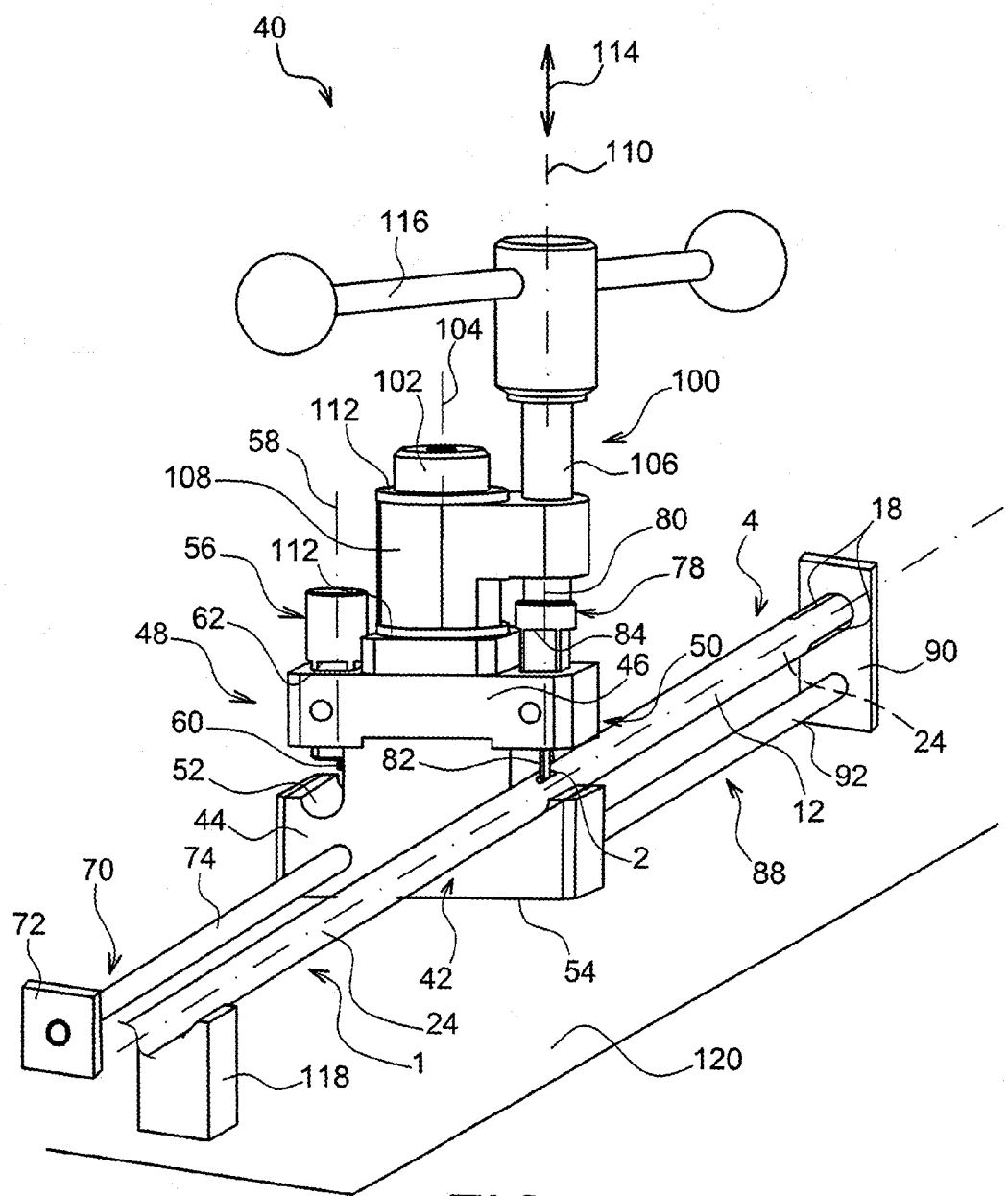

FIG. 9 illustrates the application of a method according to the invention for pressure-crimping a cleat/cotter pin in one element, applied to the cleat of the handling device shown in FIGS. 1-5 and carried out by means of the tool shown in FIGS. 6-8; and FIG. 10 illustrates the application of a method according to the invention for extracting a cleat/cotter pin out of an element by driving it out by pressure, in which it is crimped, applied to the cleat of the handling device shown in FIGS. 1 and 5 and carried out by means of the tool shown in FIGS. 6-8.

First of all, referring to FIGS. 1-3, a device 1 for handling nuclear fuel pencils (not shown) may be seen, this device notably having, as this will be described in detail hereafter, a cleat 2 capable of being crimped by pressure into a given element of the device, as well of being extracted by driving it out of this same element by pressure by means of a tool according to the present invention.

Globally, this handling device 1 is conventional and known to one skilled in the art. For this reason, the description which will be made of it below, will remain brief.

The device 1 essentially has a gripping claw 4 located at one of the ends of the latter, a control of this remote claw 8 at the other end of this device. As well as a central portion 6 called a tie rod extending longitudinally between both ends, over a distance which may be close to several meters, for example about seven meters.

The claw 4 includes a mechanical tulip 10 and a tulip lock 12 surrounding the latter, the lock 12 here assuming the shape of a tube or a case preferably extending along the quasi-totality of the length of the device 1, of longitudinal axis 14. The lock 12 is therefore capable of being moved relatively along the tulip 10 in an actuation direction 16 parallel to the axis 14, in order to generate opening/closing of the mechanical tulip 10.

Figure 3:
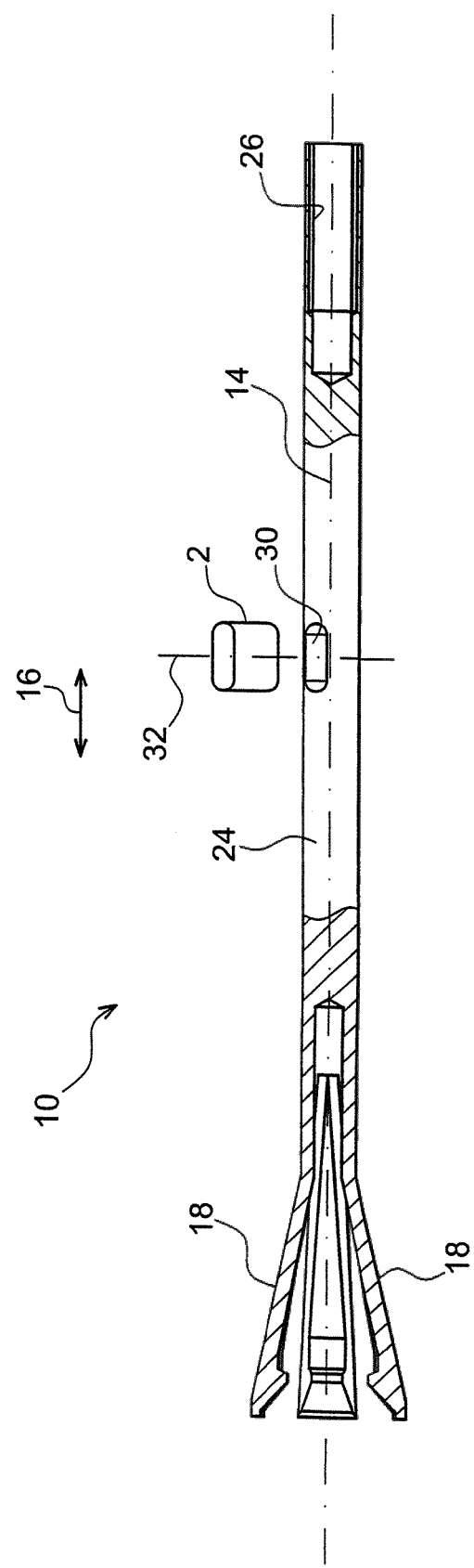
FIG. 3 illustrates an enlarged view of a portion of the handling device forming a claw for gripping fuel pencils, on which said cleat is intended to be crimped by pressure.

As shown by FIGS. 1 and 3, the mechanical tulip 10 is provided at its end with heads 18 spaced out circumferentially and intended to be in contact with the lock 12 outwardly, the latter forming an outer radial abutment for the head, allowing them to be radially pushed back inwardly. As an indication, in FIG. 1, the device 1 is found in a condition where the heads 18, which are totally radially pushed back inwardly, allow the placement of a protective plug 22 intended to protect the claw 4 and in particular its gripping heads 18. This condition is of course adopted during the periods of non-use of the handling device 1.

In this type of mechanism where the relative positioning along the direction 16 between the lock 12 and the mechanical tulip 10 may be adjusted, the latter is designed so that its heads 18 are deployed at most in their rated position, i.e. when they are non-stressed by the lock 12, as shown in FIG. 3. Thus, as mentioned above, it is the lock 12 placed on the outside of the tulip which allows the deployed heads 18 to be pushed back, the retained design actually been such that the amplitude of the deployment of the heads 18 is directly related to the positioning of the lock relatively to the tulip.

Moreover, the heads 18 are borne by a tulip rod 24, arranged along the longitudinal axis 14, and the end of which opposite to the one bearing the heads 18 is provided with a thread 26 for its mounting on an inner cylinder 28 extending up to the control 8.

In order to provide guidance of the lock 12 relatively to the tulip 10 during the relative movement between both of these parts along the actuation direction 16, provision is therefore made for a cleat 2 crimped in a through-orifice 30 of the tulip rod 24, this orifice 30 being preferentially of an oblong shape as this is better visible in FIG. 3, and made along an axis 32 orthogonal to the longitudinal axis 14 of the device.

Moreover, the cleat 2 of an oblong shape substantially mating that of the through-orifice 30 has two ends respectively protruding on either side of the tulip rod 24 and slidably mounted along the actuation direction 16 in two opposite oblong holes 34 made on the tulip lock 12 respectively. Naturally, in order to allow a relative displacement between the rod 24 fixedly bearing the cleat 2 and the lock 12 cooperating with the ends of the latter, the oblong holes 34 have a greater longitudinal dimension along the direction 16 than that of the oblong through-hole 30, it being understood that these oblong holes 34 are also made as through-holes on the lock 10 having the shape of a tube or a case.

Thus, FIG. 4 shows that during a relative movement along the actuation direction 16 between the tulip 10 and the lock 12, aiming at bringing the latter closer to the control 8, a gradual release of the heads 18 is observed, the heads assuming their deployed rest position. In this configuration, it then becomes possible to introduce between the heads 18 an end 36 for connecting a nuclear fuel pencil 38, before again performing a relative movement in the opposite direction between the tulip 10 and the lock 12, this time aiming at moving the latter away from the control 8, with the purpose of radially pushing back inwardly the heads 18 by means of the lock 12 until these heads 18 exert sufficient retention pressure on the connecting end 36 of the nuclear fuel pencil 38, so that the latter is properly held on the handling device 1, as this was schematized in FIG. 5.

Next, the pencil 38 may then be handled by the device 1, e.g. for ensuring its extraction from a skeleton, or its introduction into the latter.

The tool 40 which will now be described with reference to FIGS. 6-8, object of the present invention, is designed so as to be used in order to alternately ensure crimping of the cleat 2 by pressure in the tulip rod 24, and extraction of this cleat 2 from the rod by driving it out by pressure.

As regards the driving-out extraction operation by pressure, the latter may be performed during maintenance operations requiring detachment of the mechanical tulip 10 and of the lock 12. Indeed, unscrewing the tulip 10 mounted on the inner cylinder 28 by means of the thread 26 can only be carried out after having removed the cleat 2 from its orifice 30.

Additionally, the pressure crimping operation may as for it be performed during these same maintenance operations, following detachment of the mechanical tulip 10 and of the lock 12, after having again assembled the tulip 10 by screwing it onto the inner cylinder 28. Further, this crimping operation should also be performed during assembly of a new handling device.

The tool 40 shown in FIGS. 6-8, forming a portable tool of low bulkiness, first of all has a body 42 provided with a base 44, and a head-holder 46 which is firmly attached to it.

Globally, it is divided into two opposite portions relatively to a vertical plane, the first portion 48 being dedicated to pressure crimping while the second portion 50 is dedicated to driving-out by pressure. In this respect, clear inscriptions are provided on each of these portions 48, 50, such as <<crimping>> and <<driving-out>>, in order to allow the user to rapidly make a selection of the portion adapted to the relevant operation, without any risk of making a mistake.

Thus, for the first portion 48, a first receptacle 52 of the claw 4 is made on the base 44, this receptacle 52 for example having a semi-circular section with a shape mating that of the outside of the claw 4, i.e. that of the outer surface of the lock 12, as this is better visible in FIG. 7. The aperture of this receptacle 52 is oriented upwards, i.e. opposite to a supporting surface 54 of the base on which the latter is intended to rest, for example on a support called <<drawing bench>>.

Opposite this receptable 52 is located a pressure crimping head 56 intended to cooperate with the cleat 2, this crimping head 56 being movably mounted along a first sliding direction 58 on the head holder 46, this first direction 58 being preferably parallel to the vertical, and therefore orthogonal to the horizontal in which the claw 4 is intended to rest in the receptacle 52 during an operation for crimping the cleat 2.

As an indication, the crimping head 56 globally assumes a shape known to one skilled in the art, notably as regards the presence of a crimping punch 60 at its end intended to contact the cleat 2. In FIG. 6, it may be seen that the crimping head 56 is held at rest in a high position while the punch 60 is not in contact with the cleat, nor with any other element. This preferably adopted functionality may for example be achieved by means of return elastic means (not shown) arranged between the head holder 46 and the crimping head 56, or else by means of an adapted adjustment. In such a case, it is also possible to proceed in such a way that the space left free under the punch 60 is sufficient for introducing the claw 4 horizontally, by inserting the latter into the receptacle 52 along its longitudinal axis 14.

As visible in FIGS. 6-8, the crimping head 56 is equipped with abutment means 62, for example assuming the shape of a shoulder, the purpose of which is to limit its travel relatively to the body 42 during crimping. In this way, the crimping travel is predefined relatively to the geometry of the tool 40 and to that of the claw 4, so that the risks of deterioration of the latter are considerably reduced. Actually, when the shoulder 62 abuts at the end of travel against the head holder 46, the operator is advantageously informed that the crimping operation is completed, and cannot in any case exert any longer additional pressure on the cleat 2.

As this is better visible in FIG. 7, the crimping head 56 is housed in a first through-housing 66 of the head holder 46, through which it is therefore able to slide along the first direction 58. Preferably, it may be proceeded in such a way that the geometries adopted for the first housing 66 and the sliding portion of the crimping head 56 allow the introduction of the latter into its associated orifice only when it is found in a single and predetermined orientation relatively to the head holder 46, which advantageously ensures proper positioning of the crimping punch 60 relatively to the body 42, and therefore relatively to the cleat 2 to be crimped. The risks of damaging the claw 4 during crimping of the cleat 2 are therefore considerably reduced.

Finally, first means 70 for centering the claw 4, fixedly added on the base 44 are also provided. These centering means essentially comprise an abutment 72 against which the end of the claw 4 is intended to be pressed when it rests in the first receptacle 52 in order to undergo crimping of the cleat 2 therein. The abutment 72 is thus offset from the base 44 by a tie rod 74 with a length adapted to the geometry of the claw 4, so that once the latter is in contact with the abutment 72, the cleat 2 is found to be suitably positioned opposite the crimping punch 60.

In the same way, for the second portion 50, a second receptacle 76 of the claw 4 is made on the base 44, this receptacle 76 for example having a semi-circular section with a shape mating that of the outside of the claw 4, i.e. that of the outer surface of the lock 12, as this is better visible in FIG. 7. The aperture of the receptacle 76 is oriented upwards, i.e. opposite to the supporting surface 54 of the base on which the latter is intended to rest.

Opposite this receptacle 76, a pressure drive-out head 78 is found, intended to cooperate with the cleat 2, this drive-out head 78 being mounted so as to be mobile along a second sliding direction 80 on the head holder 46, this second direction 80 being preferably parallel to the vertical and to the first direction 58 and therefore orthogonal to the horizontal in which the claw 4 is intended to rest in the receptacle 76 during an operation for driving out the cleat 2.

As an indication, the drive-out head 78 globally assumes a shape known to one skilled in the art, notably as regards the presence of a driving punch 82 at its end intended to contact the cleat 2. In FIG. 6, it may be seen that the drive-out head 78 is maintained at rest in a high position while the punch 82 is not in contact with the cleat, nor with any other element. This preferably adopted functionality may for example be achieved by elastic return means (not shown) arranged between the head holder 46 and the drive-out head 78, or else by means of an adapted adjustment. In such a case, it may then be proceeded in such a way that the space left free under the punch 82 is sufficient for introducing the claw 4 horizontally, by inserting the latter into the receptacle 76 along its longitudinal axis 14.

As visible in FIGS. 6 and 7, the drive-out head 78 is equipped with abutment means 84, for example assuming the shape of a shoulder, the purpose of which it to limit its travel relatively to the body 42 during the driving-out. In this way, the driving travel is predefined relatively to the geometry of the tool 40 and to that of the claw 4. Thus, when the shoulder 84 abuts at the end of the travel against the head holder 46, the operator is advantageously informed that the drive-out operation is completed and in any case cannot exert any longer additional pressure on the cleat 2.

Figure 7A:
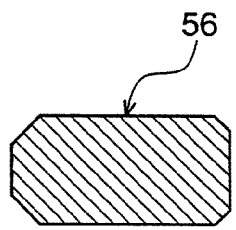
FIGS. 7a and 7b show transverse sectional views of the heads of the tool shown in FIG. 6, respectively taken along the lines VIIA-VIIA and VIIB-VIIB of FIG. 7.
Figure 7B:
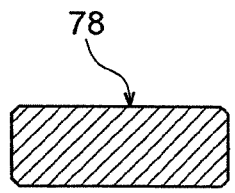

As this is better visible in FIG. 7, the drive-out head 78 is housed in a second through-housing 86 of the head holder 46, through which it is therefore able to slide along the second direction 80. Preferably, it may be proceeded in such a way that the geometries adopted for the second housing 86 and the sliding portion of the drive-out head 78 allow the introduction of the latter into its associated orifice only when it is found in a single and predetermined orientation relatively to the head holder 46, which advantageously ensures proper positioning of the driving punch 82 relatively to the body 42, and therefore relatively to the cleat 2 to be driven out. The risks of damaging the claw 4 during the driving-out of the cleat 2 are consequently considerably reduced. Further, it is noted in this respect that the first and second housings 66, 86 and the heads 56, 78 have a geometry forming a foolproofing system, i.e. they prevent the mounting of the crimping head 56 in the second housing 86 and also prevent the mounting of the drive-out head 78 in the first housing 66. In this way, the risks of deteriorating the claw 4, likely to be generated by involuntary inversion of both heads 56, 78 on the head holder 46, are totally reduced to zero. In this respect, FIGS. 7*a* and 7*b* respectively show examples of transverse sections for the heads 56, 78, capable of forming such a foolproofing system.

Finally, second means 88 for centering the claw 4 fixedly added on the base 44 are also provided. The centering means essentially comprise an abutment 90 against which the end of the claw 4 is intended to be pressed when it rests in the first receptable 76 in order to undergo driving-out of the cleat 2 therein. The abutment 90 is thus offset from the base 44 by a tie rod 92 with a length adapted to the geometry of the claw 4, so that once the latter is in contact with the abutment 90, the cleat 2 is found to be suitably positioned opposite the driving punch 82. For various reasons like the one aiming at ensuring better stability of the tool 40 during operation, both tie rods 74, 92 extend in parallel but opposite directions from the base 44 on either side of which they are located, as shown clearly in FIG. 6.

One of the particularities of the present invention lies in the fact of providing pressure means 100 movably mounted on the body 42 so as to be able to be moved from a crimping position in which they are capable of exerting pressure on the crimping head 56 in order to cause its displacement in the first direction 58, to a drive-out position shown in FIGS. 6-8 in which they are capable of exerting pressure on the drive-out head 78 in order to cause its displacement in the second direction 80 and conversely.

To do this, the body comprises a pivot pin 102 protruding upwards from the head holder 46, this pivot pin 102 being arranged substantially vertically along an axis of rotation 104 of the pressure means.

These pressure means 100 then comprise a pressure rod 106 mounted in a parallel and excentered way, relatively to the axis of rotation 104, on a rotatably fitted-in rod support 108 on the pin 102. Thus, the tool 40 is designed and dimensioned so that by pivoting the rod support 108 around the axis of rotation 104 relatively to the pin 102, the pressure rod 106 of axis 110 may alternately become placed in the crimping position, in which its pressure end is located opposite the high end of the crimping head 56, e.g. symbolized by the alignment or quasi-alignment of the axis 110 with the first direction 58, and in the illustrated drive-out position in which its pressure end is located opposite the high end of the drive-out head 78, e.g. symbolized by the alignment or quasi-alignment of the axis 110 with the second direction 80.

The rod support 108 is blocked in translation relatively to the pivot pin 102 on which it is freely jointed, along the axis of rotation, for example by means of two abutment rings 112 fixedly mounted on this same pivot pin 102, on either side of the rod support 108 respectively.

Additionally, the pressure rod 106, the low pressure end of which is intended to alternately come into contact with the heads 56, 78, is mounted on the support 108 so as to be able to be moved relatively to the latter along a pressure direction 114 parallel to its axis 110, and actually coinciding with the latter. Preferably, in order to achieve this goal, the pressure rod 106 is mounted on the rod support 108 so as to be able to be moved by screwing it relatively to the latter, along the pressure direction 114.

Further, in order to facilitate the screwing of the rod 106 aiming at causing the displacement of either one of the heads 56, 78 in its associated sliding direction, the pressure means finally comprise a control lever 116 mounted on the high end of this pressure rod 106, orthogonally and slidably relatively to the latter, as this is visible in FIGS. 6-8.

In FIG. 9, the application of a method according to the invention for crimping the cleat 2 by pressure in the tulip rod 24 surrounded by the lock 12 is illustrated, this application being achieved by means of the tool 40 which has just been described.

To do this, the claw 4 already firmly attached to the handling device 1, is placed in the receptacle 52 and moved along the axis 14 until the heads 18 of the mechanical tulip are in contact with the centering abutment 72. Further, on the other side of the tool 40, supporting parts 118 are provided for supporting the remainder of the device 1 at a height identical with that imposed by the receptacle 52, the supporting parts 118 resting on a work bench 120 in the same way as the base 44 of the tool 40.

Next, the pressure rod 106 is brought into the crimping position shown in FIG. 9 by rotation of the support 108 around the pivot pin 102, a position in which its low end is capable of contacting the crimping head 56. Finally, the lever 116 is turned about the axis 110 so as to cause setting into motion of the rod 106 in the pressure direction and of the head 56 by contact of the latter, until the head shoulder 62 will stop the crimping travel by abutment against the head holder 46. In a known way, during the crimping travel, the punch 60 will press against the cleat 2 which it slightly deforms so as to fix it in its associated through-orifice.

In FIG. 10, the application of another method according to the invention is illustrated, for extracting the cleat 2 from the tulip rod by driving it out by pressure, in which it is crimped, this application being carried out by means of the tool 40 which has just been described.

To do this, the claw 4 still firmly attached to the handling device 1, is placed in the receptacle 76 and moved along the axis 14 until the heads 18 of the mechanical tulip are in contact with the centering abutment 90. Further, on the other side of the tool 40, supporting parts 118 are provided for supporting the remainder of the device 1 at a height identical with the one imposed by the receptacle 76, these supporting parts 118 resting on a work bench 120 in the same way as the base 44 of the tool 40.

Next, the pressure rod 106 is brought into the drive-out position shown in FIG. 10 by rotation of the support 108 around the pivot pin 102, a position in which its low end is capable of contacting the drive-out head 78. Finally, the lever 116 is turned about the axis 110 in order to cause the setting into motion of the rod 106 and of the head 78 by contact with the latter along the pressure direction, until the head shoulder 84 will stop the crimping travel by abutment against the head holder 46.

Of course, various modifications may be made by one skilled in the art to the invention which has just been described only as non-limiting examples.

The invention claimed is:

1. A tool used for pressure crimping of a cleat/cotter pin in an element and extracting said cleat/cotter pin from the element by driving the cleat/cotter pin out by pressure, characterized in that the tool comprises:
   a first receptacle of said element opposite in which is located a pressure crimping head intended to cooperate with said cleat/cotter pin, the pressure crimping head being movably mounted along a first direction on a body of the tool;
   a second receptacle of said element opposite in which is located a pressure drive-out head intended to cooperate with said cleat/cotter pin, this pressure drive-out head being also movably mounted along a second direction on said body of the tool; and
   pressure means movably mounted on said body of the tool in order to be able to be moved from a crimping position in which the pressure means are capable of exerting pressure on said pressure crimping head in order to cause displacement of the pressure crimping head in said first direction, to a drive-out position in which the pressure means is capable of exerting a pressure on said pressure drive-out head in order to cause displacement of the pressure drive-out head in said second direction, and conversely.

2. The tool according to claim 1, characterized in that said body of the tool has first and second housings respectively receiving said pressure crimping head and said pressure drive-out head, and in that said first and second housings and said pressure crimping head and pressure drive-out head have a geometry forming a foolproofing system preventing the mounting of said pressure crimping head in the second housing and preventing the mounting of said pressure drive-out head in said first housing.

3. The tool according to claim 1, characterized in that said pressure crimping head is equipped with abutment means capable of contacting said body, in order to limit the travel of said pressure crimping head, along said first direction, relatively to said body of the tool.

4. The tool according to claim 1, further comprising first means for centering the element relatively to said pressure crimping head, against which said element is intended to be pressed when the pressure crimping head rests in said first receptacle and further comprising second means for centering the element relatively to said pressure drive-out head, against which said element is intended to be pressed when the pressure drive-out head rests in said second receptacle.

5. The tool according to claim 1, characterized in that said first and second directions respectively attached to the pressure crimping head and pressure drive-out head are parallel sliding directions.

6. The tool according to claim 1, characterized in that said pressure means are mounted so as to be able to freely rotate on said body of the tool, so that the pressure means is displaceable from said crimping position to said drive-out position, and conversely, by rotation of these pressure means relatively to said body, about an axis of rotation.

7. The tool according to claim 1, characterized in that said pressure means comprise a pressure rod mounted on a rod support so as to be able to be displaced relatively to the latter along a pressure direction, and said body of the tool comprising a pivot pin, said support being mounted so as to be able to freely rotate on the pivot pin and extending along an axis of rotation of the pressure means.

8. The tool according to claim 7, characterized in that said pressure rod is mounted on the rod support so as to be able to be displaced by screwing relatively to the latter, along said pressure direction.

9. The tool according to claim 7, characterized in that said rod support of the pressure means is blocked in translation relatively to the pivot pin, along said axis of rotation.

10. The tool according to claim 7, characterized in that said pressure means further comprise a control lever mounted on said pressure rod.

11. A method for pressure crimping a cleat/cotter pin in an element, said method being applied by means of a tool according to claim 1, by placing said element in said first receptacle, and then by actuating said pressure means placed in the crimping position so that the cleat/cotter pin and the element cooperate with said pressure crimping head of said tool.

12. A method for extracting a cleat/cotter pin out of an element by driving the cleat/cotter pin out by pressure wherein the cleat/cotter pin is crimped, said method being applied by means of a tool according to claim 1 by placing said element in said second receptacle, and then by actuating said pressure means placed in the drive-out position so that the cleat/cotter pin and the element cooperate with said pressure drive-out head of said tool.

13. The method according to claim 11, characterized in that said element is a claw comprising a mechanical tulip and a tulip lock surrounding said tulip and capable of being displaced relatively along the latter in an actuation direction in order to generate opening/closing of said mechanical tulip, said cleat/cotter pin being intended to be crimped in a through-orifice of a tulip rod of said mechanical tulip.

14. The method according to claim 13, characterized in that said through-orifice of said tulip rod is made in a direction orthogonal to said actuation direction, and in that said cleat/cotter pin is intended to have two sliding ends along said actuation direction, respectively in two opposite oblong holes made on said tulip lock surrounding said mechanical tulip.

15. The method according to claim 13, characterized in that said element is a claw intended to cooperate with a nuclear fuel pencil for its introduction into a storage basket and/or its extraction from this basket.

\* \* \* \* \*